United States Patent Office 3,498,953
Patented Mar. 3, 1970

3,498,953
TREATMENT OF POLYAMIDES, POLYURE-
THANES, POLYUREAS AND POLYURE-
THANE-UREAS WITH POLYHALOGENOUS
ALKYLENE OXIDES
Gunther Elfers, Grosse Ile, Mich., assignor to Wyandotte
Chemicals Corporation, Wyandotte, Mich., a corpora-
tion of Michigan
No Drawing. Filed Sept. 26, 1966, Ser. No. 581,683
Int. Cl. C08g 20/38
U.S. Cl. 260—77.5                          3 Claims

ABSTRACT OF THE DISCLOSURE

Solvent resistant properties and flame resistance of polyamides, polyurethanes, polyureas, and polyurethane-ureas are substantially improved by treating said polymers with a polyhalogenous alkylene oxide.

---

This invention relates to the treatment of polyamides, polyurethanes, polyureas and polyurethane-ureas and shaped articles, such as filaments, textile fabrics and the like, formed therefrom for the purpose of improving the solvent resistance, the burning characteristics and the melting points.

It is well known that synthetic fibers, filaments and threads and the various textile products made from them are sensitive to some solvents which may be active enough, under sufficient concentration, temperature and time, to dissolve them. In the course of such action, the solvent penetrates first the superficial surfaces of the product and then progressively into and ultimately throughout its structure reducing it to a dispersed condition or to a liquid solution. Other solvents do not dissolve the fiber but will tend to gelatinize the surfaces of the synthetic polymer to the point it is no longer suitable for the intended purpose. For example, it is known that mineral acids, such as sulfuric acid, in low concentrations cause loss in strength of nylon fabrics and in higher concentrations completely dissolve nylon.

Many attempts have been made to try to improve the flame resistance of synthetic textile materials. For example, chlorinated paraffin and propoxylated pyrophosphates have been used to treat polyolefins. However, most of the synthetic polymeric fibrous materials are non-absorbent and treatment of such materials with solutions of lead or aluminum salts does not result in a completely satisfactory textile product.

It is an object of this invention to provide treated synthetic filaments, fibers and textile fabrics with improved solvent and flame resistance. It is another object of this invention to treat polyamides, polyurethanes, polyureas and polyurethane-ureas to improve the physical properties thereof. It is a specific object of this invention to treat the aforesaid polymers with polyhalogenous alkylene oxides to provide products with higher melting points and improved solvent and flame resistance.

The objects of this invention are accomplished by treating polyamides, polyurethanes, polyureas, polyurethane-ureas and mixtures thereof with a polyhalogenous alkylene oxide. Representative of polyhalogenous alkylene oxides that may be used to treat the aforementioned polymers include 1,1-dichloro-2,3-epoxypropane,
1,1,1-trichloro-2,3-epoxypropane,
1,1,1-trifluoro-2,3-epoxypropane,
1-bromo-1,1-dichloro-2,3-epoxypropane,
1,1-dichloro-1-fluoro-2,3-epoxypropane,
1,1-difluoro-1-chloro-2,3-epoxypropane,
other mixed 1,1,1-trihalo-2,3-epoxypropanes,
1,1,1-tribromo-3,4-epoxybutane,
1,1,1-trichloro-3,4-epoxybutane,
1,1-dichloro-3,4-epoxybutane and
other mixed 1,1,1-trihalo-3,4-epoxybutanes.

These polyhalogenous alkylene oxides may be represented by the formula

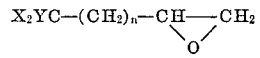

where X is selected from chlorine, fluorine, bromine and mixtures thereof; Y is chlorine, bromine, fluorine or hydrogen and $n$ is 0 or 1. The preferred polyhalogenous alkylene oxides for treating polyamides, polyurethanes, polyureas and polyurethane-ureas are 1,1,1-trichloro-2,3-epoxypropane and 1,1,1-trichloro-3,4-epoxybutane.

The term "nylon" as used in the specification has a well-established meaning. It is a generic term for any long-chain synthetic polymeric amide which has recurring carbonamide groups as an integral part of the main polymer chain and which is capable of being formed into a filament in which the structural elements are oriented in the direction of its axis. The term also includes nylon monofilaments, nylon fiber, nylon molding powders and nylon resins. The most common nylons are those obtained by condensation of diamines with dicarboxylic acids or by the auto-condensation of an amino-acid, such initial materials generally having at least six atoms in a chain. For example, the most common specific nylon resin is that obtained by the condensation of adipic acid with hexamethylenediamine. The other types of nylon are made from compounds including pyrrolidone, caprolactam, sebacic acid, ethyl aminoheptanoate, 9-aminononanoic acid, and 11-aminoundecanoic acid. The polyamides and the processes for their production are more fully explained in U.S. Patents 2,071,253, 2,130,948, 2,302,819 and 2,937,161.

The term "polyurethane" as used throughout this disclosure refers to products produced by the reaction of polyisocyanate with polyfunctional hydroxy compounds. These hydroxy compounds may be polyethers or polyesters or other materials containing hydroxy groups. These polyurethane products may be in the form of rubbers, foams, films and flexible or stiff fibers. Polyurethane filaments that may be treated by the process of this invention are more fully described in U.S. Patent 2,929,802.

Some nonlimiting examples of polyureas and polyurethane-ureas that may be treated by the process of this invention are more fully described in U.S. Patent 2,929,803 and U.S. application Ser. No. 343,464, filed Feb. 10, 1964, now U.S. Patent 3,281,397, respectively.

According to the present invention, it has been discovered that the solvent resistant properties and flame resistance of the polyamides, polyurethanes, polyureas and polyurethane-ureas can be substantially improved. The melting point of the treated polymer is also markedly increased. In general, the process of this invention comprises the steps of (1) refluxing the polymer filament, fabric, etc., to be treated with an excess of a polyhalogenous alkylene oxide for about 30 minutes to 18 hours, (2) washing the thus treated polymer with a solvent for the polyhalogenous alkylene oxide, and (3) drying the treated polymer. For best results, the polymer to be treated should be in as minute a size as practical. The smaller the particle or fabric size the more rapidly the treatment may take place, thus reducing the time needed to reflux the polymer in the polyhalogenous alkylene oxide. The refluxing temperature at atmospheric pressure is usually from about 100° C. to 250° C., depending upon the boiling point of the polyhalogenous alkylene oxide used. The polymers may also be treated in an autoclave at superatmospheric pressures with an appropriate increase in the refluxing temperature.

To facilitate the polyhalogenous alkylene oxide treatment, the material to be treated can be expanded with a swelling agent. The swelling agent can be added to the reaction vessel along with the polyhalogenous alkylene oxide. The swelling agent causes the polyamide, polyurethane, polyurea, etc., to expand in volume so that the polyhalogenous alkylene oxide will have better contact with the polymer being treated. This will tend to reduce the itme required to treat the amide-containing polymer. Dioxane is the preferred swelling agent. Other examples of swelling agents include chloroform, carbon tetrachloride, benzene, toluene and xylene. However, any compound may be used that acts as a swelling agent for the material to be treated, provided also that it does not substantially interfere with the reaction between polyhalogenous alkylene oxide and the amide group of the material to be treated.

It is also within the scope of this invention that the polyamide, polyurethane, polyureas and polyurethane-ureas may be dissolved in solvents prior to the treatment with the polyhalogenous alkylene oxide. A solvent must be chosen that will not substantially interfere with the reaction between the polyhalogenous alkylene oxide and the material to be treated. It is contemplated that some of the solvents that react slightly with polyhalogenous alkylene oxide may be used in the process of this invention. Suggested solvents are trihaloalcohols, pentachloroisopropanol, trihaloaldehydes, dimethylformamide-LiCl mixtures, etc.

All of the polymers mentioned above have one characteristic in common. They all contain the

amide group. Thus, the polyamides contain the repeating unit of

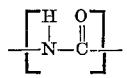

the polyurethanes contain the repeating group of

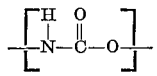

the polyureas contain the repeating unit of

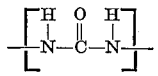

and the polyurethane-ureas contain both of the last two groups. It is to be understood that any polymer containing a

amide unit may be treated by the process of this invention. The technical explanation for the improved properties of the polymers treated by the process of this invention is not entirely understood and the supposition hereinafter is not to be considered as being limitative of the invention. However, it is believed that the polyhalogenous alkylene oxide attacks the polymer at the hydrogen bond on the nitrogen atom. Thus,

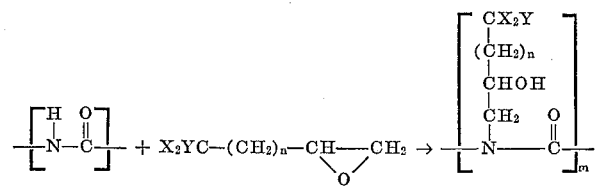

may be the reaction involved where X, Y and $n$ have the same significance as indicated above.

The following examples will more fully illustrate the invention.

Example 1

Nylon fabric of the type used for parachute material was placed in a reaction vessel. The starting nylon fabric weighed 10.7 grams. About 500 ml. of 1,1,1-trichloro-2,3-epoxypropane were placed over the nylon in the reaction vessel. The contents of the reaction vessel were brought to boiling and refluxed for about one hour. The treated nylon fabric was then washed twice in acetone and dried in a circulating air oven at 110° C. for about 15 minutes. The treated fabric at this point weighed 15.80 grams. The treated nylon fabric was then placed in a vacuum oven at 50° C. for another 15 minutes, after which it weighed 15.71 grams. A 47% weight gain was noted.

The treated nylon fabric decomposes slowly at a temperature above 340° C. without melting. The melting point of the original untreated nylon fabric was 260° C.

The treated nylon fabric could not be dissolved by leaving it in concentrated sulfuric acid for one week at room temperature. The starting nylon easily dissolved after a few hours in concentrated sulfuric acid at room temperature. The untreated nylon dissolved easily in a saturated solution of calcium chloride in methanol in a few hours at room temperature. After one week at room temperautre in a saturated solution of calcium chloride in methanol, the treated nylon fabric was not dissolved.

The amount of chlorine in the treated sample, calculated on the basis of the weight gained, was 21.0%; actual chlorine found was 15.4%.

Example 2

Shredded nylon tubing (38 grams) was refluxed in a mixture of 250 grams dioxane and 250 grams of 1,1,1-trichloro-2,3-epoxypropane for about 10 hours. The dioxane was used as a swelling agent. The treated tubing was washed in acetone and vacuum dried at 60° C. Forty and seven-tenths grams of treated nylon shredded tubing were obtained; a 7% weight gain.

Example 3

Twenty-one grams of shredded nylon tape were refluxed with about 300 ml. of 1,1,1-trichloro-2,3-epoxypropane for 2 hours. After washing twice with acetone and vacuum drying at 60° C. for 30 minutes, 26.9 grams of the treated shredded tubing were recovered. This represents a 28% weight gain. Twenty-six grams of the treated shredded tubing were refluxed for an additional 5 hours with 1,1,1-trichloro-2,3-epoxypropane, washed with acetone and dried. Twenty-seven and two-tenths grams were recovered. The total weight gain was 34%.

Example 4

Seven and one-tenth grams of nylon fabric (same fabric as Example 1) were refluxed in an excess of 1,1,1-trichloro-2,3-epoxypropane-dioxane mixture for 2 hours, with a weight gain of 8%. An additional 16-hour reflux resulted in 8.49 grams of treated fabric being recovered, representing a 20% over-all weight gain. The dioxane acted as a swelling agent in the reaction mixture. This treated fabric exhibited improved flame resistance and solvent resistance.

Example 5

A polyether polyol, a polyoxypropylene derivative of pentaerythritol, having a molecular weight of about 600 was reacted with methylene diphenylisocyanate and cast as a polyurethane film. The polyurethane film was removed from the substrate and placed in a reaction vessel where 11.65 grams of the polyurethane film were refluxed with an excess (50 ml.) of 1,1,1-trichloro-2,3-epoxypropane for about 2 hours. The treated polyurethane film was then washed twice with acetone and vacuum dried at 60° C. for 30 minutes; 12.96 grams of treated polyurethane film were recovered, representing a weight gain of 11%.

Example 6

Polyurethane filaments are made by:
(1) Dissolving 6 grams of the bischloroformate of poly (tetramethylene oxide) glycol (M.W. 3,600) and 2.92 grams of ethylene bischloroformate in 135 ml. of benzene,
(2) Reacting with 1.52 grams of piperazine in 23 ml. of 2.2 N sodium hydroxide with vigorous agitation,
(3) Removing the benzene by evaporation,
(4) Filtering off the polymer, and
(5) Dry spinning the polyurethane filaments from an 88/12 chloroform/methanol solution.

Polyurethane filaments produced as described above (15 grams) are placed in a reaction vessel and refluxed with about 500 ml. of 1,1,1-trichloro-2,3-epoxypropane for about 2½ hours. After being washed in acetone and vacuum dried, 17.5 grams of treated polyurethane filaments are recovered, indicating a weight gain of about 16.7%.

Example 7

A polyurethane-urea is made in accordance with the procedure outlined in U.S. application Ser. No. 343,464, filed Feb. 10, 1964.

An isocyanate-terminated prepolymer is made from:
(1) 8,181 parts of a dihydric polyoxyethylene-polyoxypropylene, having a molecular weight of about 1,065 and a polyoxyethylene content of about 15%, and
(2) 2,619 parts of tolylene diisocyanate (80/20% of the 2,4/2,6 isomers).

The prepolymer is then chain extended with 6.3 parts of 2-methylpiperazine in 25 parts of water. The polymer is then washed and dried.

About 11.5 grams of the polyurethane-urea polymer are placed in a reaction vessel and refluxed with an excess (about 300 ml.) of 1,1,1-trichloro-2,3-epoxypropane for about 2 hours. After washing with acetone and drying in a vacuum oven at 60° C., about 15 grams of treated polyurethane-urea polymer are recovered, indicating a weight gain of about 30%. Solvent resistance and flame resistance is substantially improved. The melting point is higher than the melting point of the untreated polyurethane-urea polymer.

Example 8

Twenty grams of polyurethane filaments made as described in Example 6 are placed in a reaction vessel and refluxed with about 400 ml. of 1,1,1-trichloro-3,4-epoxybutane for about 3½ hours. The treated polyurethane filaments are washed in acetone and vacuum dried. Twenty-six and five-tenths grams of treated polyurethane filaments are recovered indicating a weight gain of about 32.5%.

What is claimed is:
1. The method of improving the flame and solvent resistance of polycarbonamides comprising the steps of:
   (A) treating polycarbonamides in an excess of 1,1,1-trichloro-2,3-epoxypropane for about 2 to 10 hours at a temperature from about 100° C. to 250° C.;
   (B) washing the thus treated polycarbonamides with acetone; and
   (C) drying the treated polycarbonamides.

2. A method of improving the solvent resistance, the burning characteristics, and the melting points of a polycarbonamide comprising the steps of:
   (A) treating said polycarbonamide with an excess of a trichloroalkylene oxide, represented by the formula

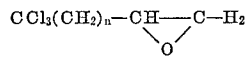

wherein $n$ is 0 or 1, for about 30 minutes to 18 hours at a temperature from about 100 to 250° C.;
   (B) washing the thus treated polycarbonamide with a solvent for said trichloroalkylene oxide; and
   (C) drying the treated polycarbonamide.

3. The method of claim 2 wherein $n$ is 0.

References Cited

UNITED STATES PATENTS

| | | | |
|---|---|---|---|
| 2,998,295 | 8/1961 | Goldann | 260—78 |
| 3,125,552 | 3/1964 | Loshaek et al. | 260—78 |
| 3,159,612 | 12/1964 | Tsou et al. | 260—78 |
| 3,159,655 | 12/1964 | Tousignant | 8—115.5 |
| 3,320,215 | 5/1967 | Conte et al. | 260—78 |
| 3,329,657 | 7/1967 | Strazdins et al. | 260—78 |

HAROLD D. ANDERSON, Primary Examiner

U.S. Cl. X.R.

8—115.5; 260—75, 78